Sept. 15, 1942.                F. R. OLSON                2,295,804
                        VALVE FOR INFLATABLE ARTICLES
                            Filed Nov. 12, 1940
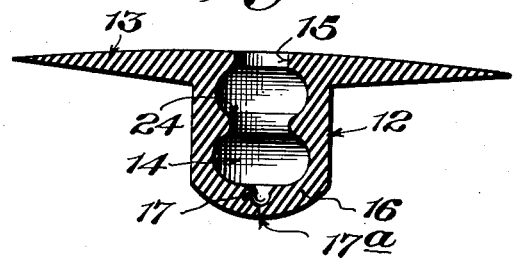
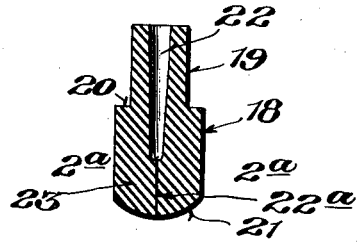
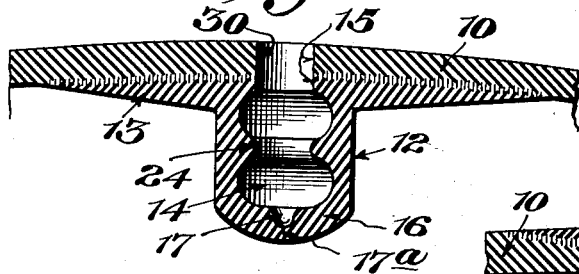
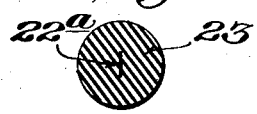
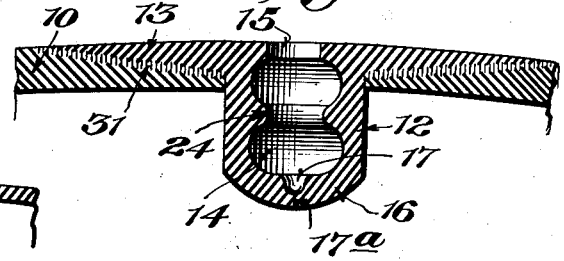
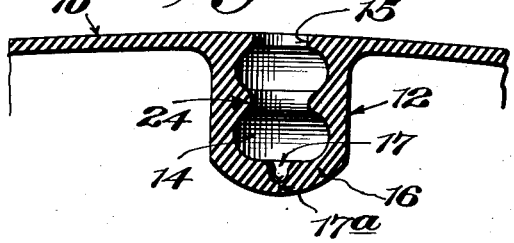
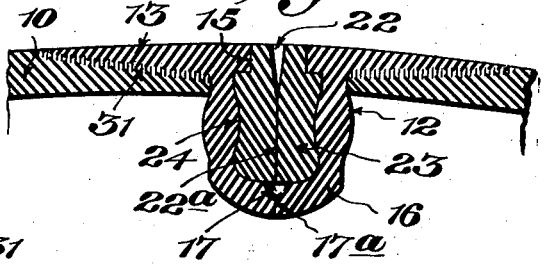
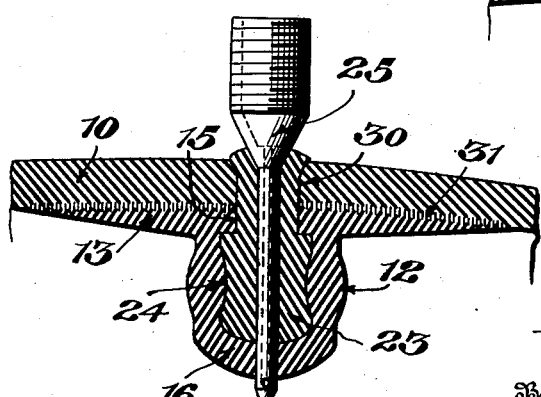
Inventor
Frank R. Olson,
Attorneys Patented Sept. 15, 1942

2,295,804

UNITED STATES PATENT OFFICE 2,295,804

VALVE FOR INFLATABLE ARTICLES

Frank Russell Olson, Lebanon, Pa., assignor to C. B. Webb Company, Lebanon, Pa., a copartnership composed of C. B. Webb and Grace I. Webb Application November 12, 1940, Serial No. 365,335

7 Claims. (Cl. 273—65)

The present invention relates to improvements in valves for inflatable articles such as balls, bladders and the like, and aims generally to improve existing valves for that purpose.

More specifically the invention aims to improve that type of all rubber valves for balls, bladders and the like which are intended to be inflated by an inflating needle. To that end I provide a two-part valve comprising a casing or hub and stem or plug of such construction that the casing may be readily incorporated in the ball or other article during its manufacture, and the stem or plug thereafter inserted when inflation is desired.

One embodiment of the invention is illustrated in the accompanying drawing and more specifically described in the following description.

One of the objects of the present invention is to provide a new and improved rubber valve casing that may be assembled on the interior or exterior of the wall of the ball or bladder as desired, or may be molded as an integral part of the article as the latter is molded, formed or cured.

A further object of the invention is to improve the construction of all rubber valves of the two-part type to provide a more efficient and effective air seal against escape of air from the inflated article.

Other objects and advantages will be apparent to those skilled in the art from a consideration of the following description of the invention with reference to the accompanying drawing illustrating a preferred embodiment of the invention.

In the drawing

Fig. 1 is a sectional view of a valve casing construction in accordance with one embodiment thereof;

Fig. 2 is a sectional view of the plug;

Fig. 2ª is a horizontal section taken on the line 2ª—2ª of Fig. 2;

Fig. 3 is a sectional view of the valve assembled with a wall of the article according to a preferred embodiment;

Figs. 4 and 5 are similar views illustrating a different manner of assembling the valve with the article to be inflated;

Fig. 6 is an enlarged sectional view illustrating the manner of inflating the article; and Fig. 7 is a similar view after inflation.

Referring more particularly to the illustrated embodiment of the invention shown in the drawing, the improved valve may be used with any desired type of article to be inflated, as for example a playing ball, bladder and the like. For purposes of illustration I have shown a section of a wall 10 of a ball or bladder which may be constructed of a single thickness of rubber compound, although other constructions of walls obviously may be used.

The valve casing (Fig. 1) according to the invention is constructed of soft pliable elastic material, for example, rubber, and may be formed with a substantially cylindrical body 12. The casing 12 may be provided with an upper disk portion 13 for attachment to the wall 10 of the article, or may be molded, formed or cured integrally with the wall 10 as illustrated in Fig. 5. The casing 12 is formed with an internal cavity 14 opening through the upper end through a restricted neck 15 and the bottom of the cavity is completely closed by a convex wall 16 preferably provided with a cavity 17 extending part way through the wall 16, for a purpose hereinafter described.

Prior to assembly of the valve casing in the article 10, the wall 16, below the bore 17, is punctured by a sharp needle-like instrument to provide a minute puncture 17ª which will permit the subsequent insertion of an inflating needle, but which is self-closing after removal of the needle.

A valve stem or plug (Fig. 2) of soft pliable elastic material, such as rubber, is adapted to be inserted in the valve casing, after assembly of the casing in the article 10, and comprises a body 18 of greater volume than the cavity 14, having a reduced neck 19 at one end forming a shoulder 20 with the body 18 adapted to seat under the neck 14 of the valve casing. In the illustrated embodiment of the invention, the valve plug body 18 is cylindrical in shape with a lower end 21, and corresponds in diameter and length to the maximum diameter and length respectively of the cavity 14 of the casing 12. The valve stem or plug is formed with a bore 22, preferably tapered, extending from is upper end downwardly through the neck 19 and terminating below the shoulder and substantially above the end providing a solid plug end 23 of substantial depth. The plug end 23 is pierced or punctured axially of the bore 22 to provide a minute puncture 22ª in the flexible body for the reception of an inflating needle, and which will be self-closing upon removal of the needle, by reason of the pliable nature of the material of the body 18.

As stated above, the volume of the body 18 of the plug is greater than the volume of the cavity 14, and preferably this is effected by increasing the combined wall thickness of the plug and valve casing substantially in the plane of the juncture of the bore 22 and the puncture 22ª. This may be accomplished by forming the cavity 14 with an inwardly extending annular rib 24 so that the cavity resembles an hour-glass in shape. The construction thus provided by the rib 24 exerts an annular contracting pressure on the side walls of the plug substantially in the plane of the juncture of the bore 22 and puncture 22ª exerting a high unit wall pressure against the plug throughout a section of the length thereof, tending to effectively seal the passage 22ª against the escape of inflating pressure. The increased thickness of the material may be included on the valve casing or the plug, as desired, but preferably the cooperating surfaces of the plug and cavity should not be complementary in shape.

After the valve plug has been assembled in the valve casing, the article may be inflated by introducing an inflating needle 25 through the bore 22, puncture 22ª, bore 17 and puncture 17ª. The needle, properly lubricated, passes through puncture 22ª, and is guided by cavity 17 on the interior wall 16 to the puncture 17ª and thus to the interior of the ball or bladder. When the article has been properly inflated, the inflating needle may be readily withdrawn from the valve. The presence of the cavity 17 in the inner side of the end wall 16 prevents tearing of end wall 16 by guiding inflating needle through puncture 17ª.

The construction of the valve casing and plug, as well as the relative volumes thereof, as described above, insure an effective seal against the escape of inflating pressure as the needle is withdrawn. Due to the increased size of the plug body 18 over the cavity 14, the side walls of the cavity are distended as shown in Fig. 7, which tends to draw the lower wall 16 of the casing upwardly and close the puncture 17ª against the escape of air. As the inflating needle is further withdrawn from the plug, the puncture 22ª is closed throughout its length, because of the oversize volume of the body 18, stretching the casing, and resulting in overall constriction of the cavity 14 as by the rib 24, results in a high unit wall pressure against the wall of the plug substantially in the plane of the juncture of the bore 22 and puncture 22ª to more effectively seal the plug against leakage.

The provision of the wall 16 of the casing 12 in combination with the cavity 17 effectively prevent the plug being forced through the casing to the interior of the article should the inflating needle stick in the puncture 22ª due to improper lubrication at a time when the inflating needle is inserted in the valve.

The valve may be secured to the wall 10 of the article to be inflated in a variety of ways as illustrated in Figs. 3, 4 and 5. Preferably, the valve is secured, as by cementing or being vulcanized to the inner surface of the wall 10 of the article as illustrated in Fig. 3. The reduced neck 19 of the plug extends through an opening 30 in the wall 10 so that the bore 22 of the valve plug is readily accessible. This construction provides a very simple, effective and durable article which affords great resistance against accidental displacement of the plug from the casing 12. In this arrangement the disk 13 may, if desired, be recessed in the wall 10 in the manner shown in Fig. 4.

Alternatively the disk 13 may be secured to the outer surface or in an apertured recess 31 in the outer surface of the wall 10 by cementing or being vulcanized thereto, as shown in Fig. 4. Or the valve casing 12 may be integrally molded, formed or cured with the wall 10, with or without the disk 13.

While I have described above a preferred form or embodiment of the invention, it will be understood that various changes in construction, shape and arrangement of the parts may be made without departing from the spirit of the invention, which includes as well equivalent constructions fully within the scope of the appended claims.

I claim:

1. A valve for sports balls and other inflatable articles comprising a valve casing secured to the wall of said article and extending into the interior thereof, said casing being formed of flexible material and provided with an internal hour-glass shaped cavity closed at its inner end, a substantially cylindrical valve plug formed of elastic material and provided with a tubular passage extending axially partly therethrough, said plug being provided with a body portion of greater volume than said cavity to place the walls of said cavity under tension when the plug is assembled in the cavity, causing constriction of the passage in said plug body throughout a substantial portion of the length thereof.

2. A valve for sport balls and other inflatable flexible articles comprising a valve casing secured to a wall of said article and extending into the interior thereof, said casing being formed of flexible material and provided with an internal cavity closed by a bottom wall, a substantially cylindrical valve plug formed of elastic material and providing a body section substantially filling said cavity, said plug having an internal bore extending part of the length thereof and a puncture through said body section axially of and inwardly beyond said bore, and an internal bead on said casing exerting a constant annular contracting pressure against the cylindrical walls of said plug tending to compress the flexible material of said plug substantially in the plane of the juncture of said internal bore with said puncture in said plug body.

3. In combination with an inflatable sports ball and the like having an apertured wall, a valve casing formed wholly of flexible rubber and comprising a cylindrical body having an enlarged upper flange for attachment to a surface of said wall, the interior of said casing body being formed into an hour-glass shaped cavity closed at its bottom end by a wall and opening through said flange through a restricted neck, a cylindrical plug of elastic material having a punctured body portion positioned within said cavity, the internal constriction of said casing cavity pressing against the cylindrical wall of said plug member to compress the elastic material transversely in a plane extending through said punctured body portion.

4. In combination with an inflatable sports ball and the like having an apertured wall, a valve casing formed wholly of flexible rubber and comprising a cylindrical body having an enlarged upper flange for attachment to a surface of said wall, the interior of said casing body being formed into an hour-glass shaped cavity closed at its bottom end and opening through said flange through a restricted neck, a cylindrical plug member of elastic material having a punctured body portion positioned within said cavity, the internal constriction of said casing cavity pressing against the cylindrical wall of said flexible plug member to compress the elastic material transversely in a plane extending through said punctured body portion, the bottom wall of said casing being formed with a minute puncture through a portion only of the thickness thereof and an aligned recess for guiding an inflating needle to said puncture.

5. A valve for sports balls, bladders and the like comprising a valve casing formed of flexible material and provided with an internal hour-glass shaped cavity closed by a bottom wall, a valve plug formed of elastic material and having a cylindrical body section filling said cavity, said plug adapted to be pierced by an inflating needle, and the bottom wall of said casing being formed with a minute puncture, and a materially smaller needle guiding cavity formed in the inner face of said wall in communication with said puncture for preventing tearing of said wall as an inflating needle is forced therethrough, the diameter of said last named cavity conforming substantially to the diameter of the needle.

6. A valve for sports balls, bladders and the like comprising a valve casing formed of flexible material and provided with an internal hour-glass shaped cavity, a wall closing the lower end of said cavity and formed with a central puncture to receive an inflating needle, a valve plug formed of elastic material and having a cylindrical body section filling said cavity, said plug having an inner end conforming to and engaging with substantially the entire area of said bottom wall.

7. An inflatable article such as sports balls, comprising an outer wall section of vulcanizable material, a valve casing of flexible material vulcanized to the inner face of said wall, said casing being formed with an internal hour-glass shaped cavity closed at its inner end by an inner wall, a valve plug of elastic material positioned in said casing and formed with a cylindrical body portion within said cavity, said plug body being of a size and volume greater than said cavity whereby the walls of said cavity are placed under tension to compress the elastic material of said plug when the valve parts are in assembled relation.

FRANK RUSSELL OLSON.